(12) United States Patent
Arora et al.

(10) Patent No.: US 11,983,654 B2
(45) Date of Patent: May 14, 2024

(54) METHOD OF OBSERVING AND EVALUATING PROCESSES AND USER ACTION EFFICIENCY WITH RECOMMENDATIONS ON CHANGE

(71) Applicant: Coupa Software Incorporated, San Mateo, CA (US)

(72) Inventors: Neha Arora, San Mateo, CA (US); Carl Rydbeck, San Mateo, CA (US); Magnus Nyquist, San Mateo, CA (US); Tony Darugar, San Mateo, CA (US); Rohit Arolkar, San Mateo, CA (US)

(73) Assignee: Coupa Software Incorporated, San Mateo, CA (US)

( * ) Notice: Subject to any disclaimer, the term of this patent is extended or adjusted under 35 U.S.C. 154(b) by 66 days.

(21) Appl. No.: 17/179,273

(22) Filed: Feb. 18, 2021

(65) Prior Publication Data

US 2022/0207441 A1 Jun. 30, 2022

Related U.S. Application Data

(60) Provisional application No. 63/132,336, filed on Dec. 30, 2020.

(51) Int. Cl.
*G06Q 10/0633* (2023.01)
*G06Q 10/0631* (2023.01)
(Continued)

(52) U.S. Cl.
CPC ... *G06Q 10/0633* (2013.01); *G06Q 10/06311* (2013.01); *G06Q 10/063114* (2013.01);
(Continued)

(58) Field of Classification Search
None
See application file for complete search history.

(56) References Cited

U.S. PATENT DOCUMENTS 8,781,882 B1 * 7/2014 Arboletti ............ G06Q 10/0639
705/7.41
10,713,063 B1 * 7/2020 Wilczek ............. G06Q 10/0633
(Continued)

FOREIGN PATENT DOCUMENTS

EP 2453395 A1 5/2012

OTHER PUBLICATIONS

Reijers, "Analysis of a collaborative workflow process with distributed actors," 2009 Information System Frontiers, vol. 11, No. 3, pp. 307-322 (Year: 2009).*

*Primary Examiner* — Ivan R Goldberg
(74) *Attorney, Agent, or Firm* — Baker Botts L.L.P.

(57) ABSTRACT

In one embodiment, a method includes detecting activity of one or more agents of a customer that modifies a processing state of a first of multiple invoices, each invoice requesting approval from the customer. The activity is conducted by the one or more agents through interacting with the procurement processing system. The method includes updating, based on the detected activity, an invoice interaction history record associated with the first invoice in an invoice interaction history datastore communicatively coupled to the procurement processing system. The method includes generating one or more metrics regarding activity of the agents affecting a processing state of the invoices based on the updated invoice interaction history datastore. The method includes providing the one or more metrics for presentation to a user of the procurement processing system associated with the customer.

18 Claims, 7 Drawing Sheets

(51) Int. Cl.
  *G06Q 10/0639* (2023.01)
  *G06Q 10/10* (2023.01)
  *G06Q 30/04* (2012.01)
(52) U.S. Cl.
  CPC . *G06Q 10/06316* (2013.01); *G06Q 10/06393* (2013.01); *G06Q 10/06398* (2013.01); *G06Q 10/103* (2013.01); *G06Q 30/04* (2013.01)

(56) References Cited

U.S. PATENT DOCUMENTS

| | | | |
|---|---|---|---|
| 2004/0260582 A1* | 12/2004 | King | G06Q 10/0633 705/7.38 |
| 2010/0306005 A1* | 12/2010 | Yengulalp | G06Q 10/0633 718/103 |
| 2017/0270596 A1* | 9/2017 | Nagalkar | G06Q 30/0637 |
| 2019/0066018 A1* | 2/2019 | Sethi | G06Q 10/0633 |
| 2020/0267209 A1* | 8/2020 | Lyons | G06Q 10/06393 |
| 2020/0311668 A1 | 10/2020 | Li et al. | |

\* cited by examiner

400
Invoice interaction history

| Invoice ID | Invoice Number | Supplier | Status | Created By | Updated By | Acting As |
|---|---|---|---|---|---|---|
| 435 | INV_101 | Supplier_1 | Draft | John Smith | John Smith | Creator |
| 435 | INV_101 | Supplier_1 | AP Hold | John Smith | Jane Doe | Reviewer |
| 505 | INV_143 | Supplier_2 | New | John Smith | John Smith | Creator |
| 505 | INV_143 | Supplier_2 | AP Hold | John Smith | John Smith | Reviewer |

| Action | Created Date | Updated At | Field Name | From Value | To Value |
|---|---|---|---|---|---|
| Submit | 07-04-2020 05:01:23 | 07-04-2020 09:58:17 | | | |
| Release Hold | 07-04-2020 05:01:23 | 07-19-2020 14:36:02 | | | |
| Submit | 07-06-2020 13:14:11 | 07-14-2020 07:45:58 | | | |
| Submit | 07-06-2020 13:14:11 | 07-14-2020 07:52:46 | | | |

*FIG. 4*

METHOD OF OBSERVING AND EVALUATING PROCESSES AND USER ACTION EFFICIENCY WITH RECOMMENDATIONS ON CHANGE

PRIORITY

This application claims the benefit, under 35 U.S.C. § 119(e), of U.S. Provisional Patent Application No. 63/132,336, filed 30 Dec. 2020, which is incorporated herein by reference.

TECHNICAL FIELD OF THE INVENTION

The present disclosure is in the technical field of configurable software platforms and platform interfaces. The disclosure also is in the technical field of computer-implemented process insight and process management.

BACKGROUND

Process management refers to assessing and changing computer-implemented processes, such as the sequence, branch paths, and substance of steps that are available or used in a complex online software-as-a-service (SaaS) platform. Process insight refers to obtaining data that can lead to understanding why certain steps are used. In process insight and process management, a sought-after metric relates to the amount of time that the process spends in one of several stages of the process as well as the overall time for the process to be carried from inception to completion. This metric, and those related to it, can be used to analyze various computer-implemented business processes to understand how efficiently the process is currently working and can be used to identify particular areas of inefficiency. As an example, managers, analysts, and other entities evaluating process efficiency often need to know how efficiently the processes involved in their respective areas of operation are working.

In the context of online procurement or spend management computer systems, relevant processes for evaluation can include the process for submitting and approving invoices for reimbursement. Even in the relatively limited context of procurement analysis, business spend management (BSM) processes can help identify various inefficiencies and areas for improvement. For example, in a process flow that seeks to approve valid invoices submitted for review, there are competing interests in ensuring only that accurate and valid invoices are approved while avoiding unnecessary time in ensuring that submitted invoices are genuine. Additional time spent in creating, submitting, approving, and paying out for invoices amounts to misusing valuable resources that may be better used elsewhere. Inefficiencies can arise, for example, because different departments and information sources must be synthesized in order for reviewers to have the full context of reviews. Additionally, different stages of reviewing invoices may be handled by entirely different departments. Inefficiencies can involve excess CPU cycles, use of computer memory, use of non-volatile digital storage, network bandwidth, and other computing resources.

Because of these inefficiencies, there is an opportunity to provide effective systems to facilitate the review and improvement of BSM processes. Remedies for these inefficiencies can include changes in configuration, operating parameters, or flow sequences of the SaaS application. There is an acute need to collect digital data representing inefficiencies in CPU cycles, use of computer memory, use of non-volatile digital storage, network bandwidth, and other computing resources so that automatic configuration changes, parameter changes, or reprogramming can be implemented or considered.

SUMMARY OF PARTICULAR EMBODIMENTS

The appended claims may serve as a summary of the invention.

In one or more embodiments, a computer-implemented procurement processing system is programmed to detect activity of one or more agents of a plurality of agents of a customer that modifies a processing state of a first invoice of a plurality of invoices. Each invoice may be requesting approval from the customer. The activity may be conducted by the one or more agents through interacting with the procurement processing system. The procurement processing system is programmed to update, based on the detected activity, an invoice interaction history record associated with the first invoice in an invoice interaction history datastore communicatively coupled to the procurement processing system. The procurement processing system is programmed to generate one or more metrics regarding activity of the plurality of agents affecting a processing state of the plurality of invoices based on the updated invoice interaction history datastore. The procurement processing system is programmed to provide the one or more metrics for presentation to a user of the procurement processing system associated with the customer.

In one or more embodiments, the one or more metrics may include one or more of an average processing time for the one or more agents to approve an invoice of the plurality of invoices, an average in-phase time for an invoice of the plurality of invoices corresponding to an amount of time spent by the invoice in a creation phase, review phase, or approval phase, a number of invoices created, reviewed, or approved, by the one or more agents or by a first agent of the one or more agents, or a number of invoices created, reviewed, or approved, by the one or more agents or by a first agent of the one or more agents, where the processing time of the invoice is greater than a projected time. In one or more embodiments, the one or more metrics are provided for presentation to the user in an interactive user interface for reviewing and comparing the one or more metrics.

In one or more embodiments, the detected activity of the one or more agents may advance a workflow for processing invoices according to a specification associated with the customer. The recommendation for altering the workflow may include adding or removing one or more steps of the workflow, modifying an assignment of agents to the one or more steps of the workflow, or automating one or more steps of the workflow. In some embodiments, the procurement processing system is programmed to automatically implement changes in configuration, parameters, or workflows. In one or more embodiments, detecting the activity of the one or more agents that modifies the processing state of the first invoice may include receiving an input from the one or more agents, determining the first invoice as an associated invoice based on the input, determining a change in processing state of the first invoice based on the input; and storing the change in processing state, an identifier for the one or more agents, and a timestamp in an invoice interaction history datastore. In one or more embodiments, generating the one or more metrics regarding the activity of the plurality of agents may include calculating one or more invoice processing statistics evaluating the performance of the one or more agents in creation, reviewing, or approving the one or more invoices.

In one or more embodiments, the procurement processing system is programmed to calculate, for one or more metrics, a community average value of the metric. The community average value of the metric may be based on metrics generated for one or more additional customers that share a trait with the customer. The procurement processing system is programmed to provide the community average value of the metric for presentation to the user of the procurement processing system in association with the one or more generated metrics. In one or more embodiments, the procurement processing system is programmed to calculate, for one or more metrics, a community benchmark value of the metric. The community benchmark value of the metric may be based on metrics generated for one or more additional customers that share a trait with the customer. The procurement processing system may be programmed to provide the community benchmark value of the metric for presentation to the user of the procurement processing system in associated with the one or more generated metrics. In one or more embodiments, the procurement processing system may be programmed to calculate the community benchmark value of the metric by calculating metric values of a plurality of customers associated with the procurement processing system, normalizing the metric values of the plurality of customers based on the shared trait, refactoring the metric values to eliminate outlier values, and calculating the community benchmark value from the refactored metric values. In one or more embodiments, the procurement processing system may be programmed to refactor the metric values to eliminate outlier values by removing invalid values for the metrics, where invalid values are determined based on a metric category of the metric, identifying a percentile of remaining metrics corresponding to a percentile of customers having an optimal performance with respect to the remaining metrics, determining that the percentile of remaining metrics comprises at least a threshold number of independent values, and combining the percentile of remaining metric values.

The embodiments disclosed herein are only examples, and the scope of this disclosure is not limited to them. One or more embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 4 illustrates an example invoice interaction history table.

DESCRIPTION OF EXAMPLE EMBODIMENTS

Figure 1:
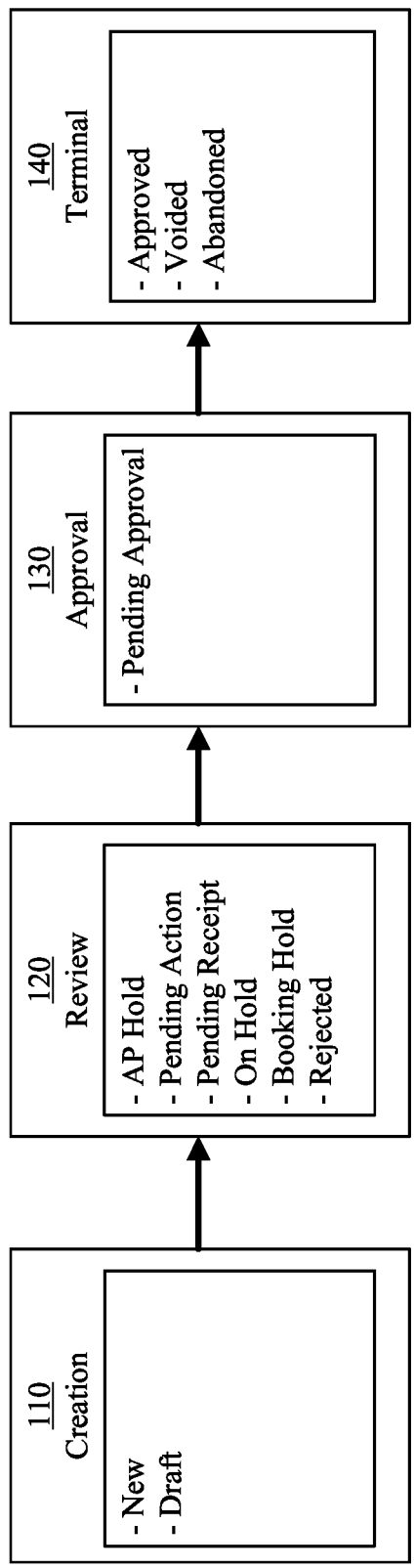
FIG. 1 illustrates an example invoice review process.

In one or more embodiments, a procurement processing system may detect activity of one or more agents of a plurality of agents of a customer that modifies a processing state of a first invoice of a plurality of invoices. Each invoice may be requesting approval from the customer. The activity may be conducted by the one or more agents through interacting with the procurement processing system. The procurement processing system may update, based on the detected activity, an invoice interaction history record associated with the first invoice in an invoice interaction history datastore communicatively coupled to the procurement processing system. The procurement processing system may generate one or more metrics regarding activity of the plurality of agents affecting a processing state of the plurality of invoices based on the updated invoice interaction history datastore. The procurement processing system may provide the one or more metrics for presentation to a user of the procurement processing system associated with the customer. In one or more embodiments, the one or more metrics may include one or more of an average processing time for the one or more agents to approve an invoice of the plurality of invoices, an average in-phase time for an invoice of the plurality of invoices corresponding to an amount of time spent by the invoice in a creation phase, review phase, or approval phase, a number of invoices created, reviewed, or approved, by the one or more agents or by a first agent of the one or more agents, or a number of invoices created, reviewed, or approved, by the one or more agents or by a first agent of the one or more agents, where the processing time of the invoice is greater than a projected time. In one or more embodiments, the one or more metrics are provided for presentation to the user in an interactive user interface for reviewing and comparing the one or more metrics.

Process management refers to assessing and changing computer-implemented processes, such as the sequence, branch paths, and substance of steps that are available or used in a complex online software-as-a-service (SaaS) platform. Process insight refers to obtaining data that can lead to understanding why certain steps are used. In process insight and process management, a sought-after metric relates to the amount of time that the process spends in one of several stages of the process as well as the overall time for the process to be carried from inception to completion. This metric, and those related to it, can be used to analyze various computer-implemented business processes to understand how efficiently the process is currently working and can be used to identify particular areas of inefficiency. This disclosure will describe techniques for analyzing processing time in the context of online procurement, or spend management, and specifically from the buyer-side perspectives, but these same techniques can equally be applicable to the seller-side context or to other operational fields without significant modification thereof.

As an example, managers, analysts, and other entities evaluating process efficiency often need to know how efficiently the processes involved in their respective areas of operation are working. In the context of procurement, relevant processes for evaluation can include the process for submitting and approving invoices for reimbursement. Even in the relatively limited context of procurement analysis, business spend management (BSM) processes can help identify various inefficiencies and areas for improvement. For example, in a process flow that seeks to approve valid invoices submitted for review, there are competing interests in ensuring only that accurate and valid invoices are approved while avoiding unnecessary time in ensuring that submitted invoices are genuine. Additional time spent in creating, submitting, approving, and paying out for invoices amounts to misusing valuable resources that may be better used elsewhere. Inefficiencies can arise, for example, because different departments and information sources must be synthesized in order for reviewers to have the full context of reviews. Additionally, as explained herein, different stages of reviewing invoices may be handled by entirely different departments. Inefficiencies can involve excess CPU cycles, use of computer memory, use of non-volatile digital storage, network bandwidth, and other computing resources. Remedies for these inefficiencies can include changes in configuration, operating parameters, or flow sequences of the SaaS application or other computer-implemented processes.

FIG. 1 illustrates one example of the phases of an invoice submitted for submitted for attaching processing details and approval and further illustrates the states of the invoice. Activities that may be performed with or by a procurement processing system can include authenticating if an invoice is from a valid supplier or is associated with a valid transaction and cross-checking the invoice with any existing pre-agreed terms, such as those dictated by existing contracts, previous orders, related invoices, past payments, and actual shipped goods or services rendered. The activities can further include ensuring that correct metadata is presented with the invoice so that various systems included in or used by the procurement processing system, such as payment systems, archival system, and reporting system can process the invoice accordingly. The activities can further include signing off on a final financial approval for payment.

As illustrated in FIG. 1, a first stage 110, labeled Creation, relates to the entry of the invoice into the procurement processing system 200. The invoice can take states such as "Draft", where the invoice is in the first stages of being created prior to being ready for submission, and "New", where the invoice is ready to be submitted for approval. A second stage, 120, labeled Review, relates to when the invoice is being checked for accuracy and validity by an agent (which, as described herein may include manual review or automated review). While in review, the invoice can take states such as "AP hold", "Pending Action", "Pending Receipt", "On Hold", "Booking Hold", and "Rejected", where an agent notes some error or clarification required in the invoice. A third stage 130, labeled Approval, relates to when the invoice is deemed acceptable and ready to be paid. While in review, the invoice can take states such as "Pending Approval", where the invoice is flagged as acceptable for payment, but payment has not yet been rendered. Finally, stage 140, labeled "Terminal" is a final resting state for the invoice. States of the invoice in the Terminal stage include "Approved", where the invoice is paid, "Voided", where the invoice is deemed unacceptable by an agent, or "Abandoned", where an agent has noticed an error or point of clarification, but the submitter does not take action to correct. Managers and process analysts can easily lose the context of where information is coming from or what stages (or individuals responsible for certain stages) are responsible for unnecessary delays. There is a need, therefore, for systems to assist with and automate the review and adjustment of BSM processes.

In addition to the merging of different information sources and departments, complications can arise because different entities, or even business units within a single entity, may have different payout procedures and stated deadlines. Customers of BSM processes often operate with a highly limited view of what are ideal timelines for handling the review of invoices. Therefore, there is an additional need for systems that can securely share information about best practices across, for example, comparable industry groups, departments, and individuals, with the requisite context to ensure that the data is provided in a manner that is easily understood and is actionable. Occasionally, individual process analysts (e.g., managers of individual departments) or potential beneficiaries of BSM processes with enough commonalities (e.g., multiple departments within a single business entity) band together to attempt to build customized and one-off solutions to evaluate metrics that they believe will be of interest to the group as a whole. However, these solutions are often not generalizable and often fail to capture information that could lead to true understanding of the state of the business process and actual improvements thereof. In the case of an individual manager attempting to identify inefficiencies, they may not have the institutional support to retrieve enough useful data to perform a true analysis. In the case of beneficiaries working together, there may not be the expertise necessary to understand the needs of the group as a whole or the individual needs of individual entities.

Figure 2:
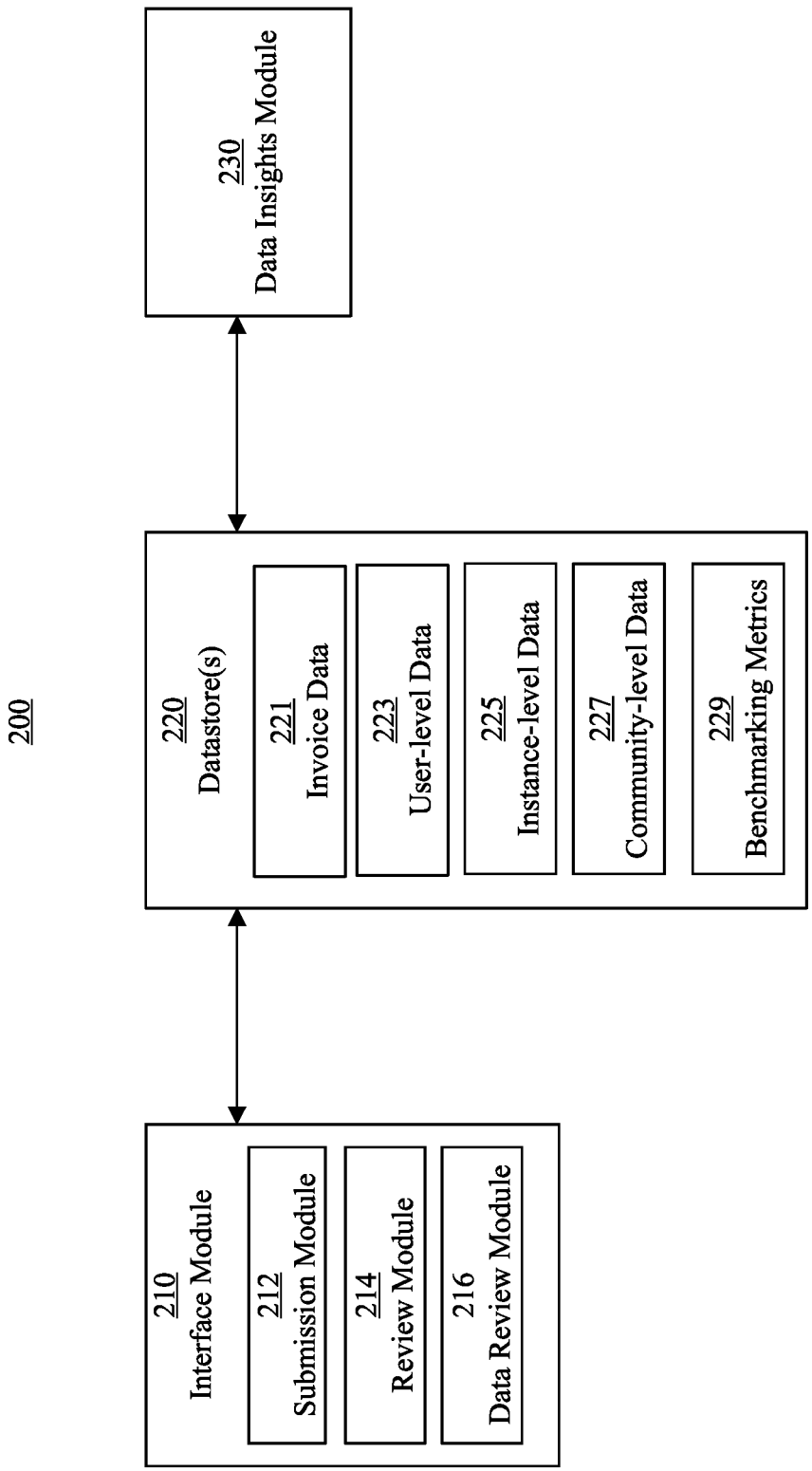
FIG. 2 illustrates an example procurement processing system.

FIG. 2 illustrates an example block-level layout of selected functions of a procurement processing system 200 as relevant to this disclosure. For the sake of brevity, components of a procurement processing system 200 not strictly germane to this disclosure have not been illustrated, but it will be understood by persons of skill in the art how to implement these non-illustrated or described components. To perform the techniques and processes described herein, the procurement processing system 200 includes an interface module 210, one or more datastores 220 communicatively coupled with the interface module, and a data insights module 230 communicatively coupled with the datastores 220.

The interface module 210 is generally configured to facilitate one or more users or user client systems to interact with the procurement processing system 200. As an example, the interface module 210 can include a submission module 212 through which a user can submit invoices to be reviewed and approved by one or more agents through the procurement processing system 200. The submission module 212 can include, as an example and not by way of limitation, a webserver provided one or more web interfaces through which a user can submit an invoice, one or more application programming interfaces through which a user or user device can submit an invoice, a mass data upload interface, or any other suitable interface. As another example, the interface module 210 can include a review module 214 through which an agent acts to review, modify, and approve an invoice. As another example, the interface module can include a data review module 216 through which one or more approved users can review advanced metrics regarding the performance of their procurement processing workflows and systems, particularly invoice processing workflows. The data review module 216 can present reports and interface user interfaces to the user based on data and benchmark metrics stored in the one or more datastores 220.

The one or more datastores 220 can be used to track information about invoices as they are processed by the procurement processing system 200 and the agents responsible for reviewing the invoices. As an example, the datastores 220 can include an invoice datastore 221 which can be used to store data about invoices, including the operational data about invoices to be approved by one or more agents. The datastores 220 can include an agent-level or user-level datastore 223 that stores interaction data and metrics about individual agents using the procurement processing system 200. The datastores 220 can include an instance-level datastore 225 that stores information about individual customers of the procurement processing system 200. The instance-level datastore 225 can be segmented to prevent unauthorized access of one customer's data by another. The datastores 220 can include a community-level datastore 227 that stores information about the entire community of customers of the procurement processing system 200. The datastores 220 can further include a benchmarking metrics datastore 229 that houses various metrics and benchmarks which may be used by customer managers to generate process insights for computer-implemented business processes and, for example, to review invoice processing performance. The benchmarking metrics datastore 229 can include information about individual agents, customers, or the community as a whole, as described herein. The benchmarking metrics datastore 229 can be generated from the other data stored in the datastores 220 by the data insights module 230 which is configured to perform the operations necessary to provide actionable metrics to the customers of the procurement processing system 200.

A first class of product features aims to focus on parts of, or the entire BSM process to allow analysis and improvement on an ongoing and repeatable basis. Process insight analysis for computer-implemented processes provides a means for customers to observe and evaluate the efficiency of their respective processes, including procurement. Process insight analysis for computer-implemented processes seeks to measure performance indicators across a wide base of customers or organizations for different activities undertaken by spend management professionals. Process insight analysis for computer-implemented processes further seeks to provide anonymized best in class guideposts and recommendations to spend management professionals to give customized and contextual guidance for how to refine improve BSM processes in a way that is actionable and not just an expression of broad goals. The analytical framework can be used to apply the feature pattern across a broad suite of BSM processes, e.g., from sourcing stages to payment stages, as well as to apply to subprocesses, such as the sourcing to contract stage of a sourcing stage. In addition to process insights, the system and computer-implemented methods described herein provides access to agent insights, providing an analysis of individual agents' activities qualitatively and quantitatively to enable efficiency and planning within the context of computer-implemented business processes, including invoicing.

Specific efficiency metrics that may be made available by systems employing the techniques described herein include quantitative efficiency analysis such as cycle time, which may be defined as the time spent to process a given request (e.g., an invoice) from start to finish. Other metrics include quantitative per-agent efficiency analysis such as the rate of processing invoices by individual agents. Metrics further include quality of review scores by individual agents, indicating rates of errors, rates of tasks requiring subsequent review or repeat work, etc. In addition, the disclosure contemplates the use of highly customizable dashboards to be used by process managers and other analysts to review data on-demand.

From the context of the process insights system, the term "customers" refers to organizations, business groups, or individuals within an organization that engage in computer-implemented business processes that may benefit from process insight analysis. As an example only, and not by way of limitation, a "customer" as used herein may include a large corporation, the accounting department of a company, or an individual handling the procurement process for a company. In particular embodiments, the process insights system and/or the methods used thereby may be integrated into a procurement or invoice processing system 200 as an additional product offered by the procurement or invoice processing system 200. Additionally, or alternatively, the process insights system may be a separate system or entity that is provided data or access to data (e.g., from a third-party system) relevant to procurement processes or invoice processing processes.

Customers can process a high volume of transactions via a procurement or invoice processing system 200, but lack visibility into how their process for handling the transactions is functioning as a whole and in its individual parts. Functioning in this context relates both to time efficiency (e.g., the amount of time that it takes for the process to run through its constituent stages) and value efficiency (e.g., whether the process is adding value to the organization, such as by identifying and preventing fraud, or by suggesting alternative procurement arrangements). While many customers have internal business intelligence tools and teams, these teams critically lack access to end-to-end process interconnections and knowledge that can be gained by pooled analysis from across the community of customers of a third-party procurement or invoice processing system 200 to determine best practices and recommendations. Customers often lack visibility into possible cross-departmental optimizations. A third-party procurement processing system can access on a large volume of context-aware data. Directed analysis, e.g., using machine-learning techniques, of this context-aware data can be used to observe overall patterns and opportunities to build efficiencies by mining and performing deep analysis on elements of their process. Additionally, analysis on this data can be used to recommend best practices or sought-after outcomes learned from well-performing customers on an anonymized basis to protect the privileged financial information of other customers. This community-based analysis is a further objective of this disclosure. By assessing, analyzing, and presenting cross customer performance indicators, analysis tools, and recommendations the procurement processing system 200 can drive knowledge sharing and efficiencies at scale across different customers and departments or sub-divisions of customers.

This functionality can be further extended to discover opportunities where repetitive tasks can be automated or assist users with intelligent suggestions to reduce and simplify follow-up options. Moreover, the metrics can be used to refine recommendations on an ongoing basis based on past performance and automated or user-submitted feedback. For example, after the procurement processing system 200 makes recommendations that affect the process flow, the system can enforce those recommendations by modifying user interactions with the system accordingly. Thus, the procurement processing system 200 is programmed to execute differently so it can be used as a tool to ensure compliance with updated workflow methodologies, without the need to increase cost or complexity in workflow processes and related systems by, for example, requiring use of an additional tool for tracking compliance. For actions that necessarily occur outside the procurement processing system 200, the system can identify metrics reflective of whether those recommendations are adopted and track said metrics. In this way, the procurement processing system 200 is programmed to operate differently that before using the techniques described to provide a powerful technical solution to the problem of tracking compliance with workflows and modifications thereto. Additionally, analysis of the agent activity log can showcase activities of individual agents to conduct performance evaluations both qualitatively and quantitatively to enable efficiency measurement and planning within the context of invoicing. As described previously, these concepts can be extended to customers performing any BSM activities and interfacing with an appropriate counterpart to the procurement and invoicing system 200.

Process insight mining for computer-implemented BSM processes allows for studying patterns in the business process flow, determining redundancies, and opportunities for improvement. As described herein, these insights can be benchmarked against common activities among other customers in the community of customers of the procurement processing system 200 to generate comparisons of performance against the entire community, relevant cohorts, at the current time or in the past. These process insight techniques can be used with machine learning methods to observe patterns over extended periods of time and recommend process modifications for efficiency and/or other process goals. Furthermore, the learning outcomes from the analysis can be used to recommend replacement and/or directly replace actions by human agents, such as input and review actions with automated or rule-based process steps. User or agent insights relating to individual agent behavior can be extended to all agent functions in the procurement management system 200 to optimize processes, capacity planning, work distribution between automated processes and human agents, etc. Recommendations can be further presented with information on how the improvement is projected to benchmark against best-in-class performance.

In prior systems an invoicing user can only access aggregate totals of invoices, there is no method to measure, benchmark and observe the invoice process in place. Invoice process efficiency is primarily tracked by a metric known as "cycle time" which traces the time taken from invoice creation to payment release to the supplier. Prior systems which provide any reporting functions relating to cycle time typically only report aggregate average cycle time per instance, which is a limited metric for invoicing users and customers leads interested in improving invoicing processes and reducing the cost thereof. A goal of the system described in this disclosure is to make invoice processing analysis information more actionable so that customers can determine baseline performance, change processes in a data-driven manner, and measure success in integrating the process changes. To do so, the process insights system must have access to more detailed cycle time information. The invoice processing system therefore provides for invoice activity monitoring on a per-agent basis to determine actions performed by the agent in specific invoice stages. The availability of data resulting from such monitoring is expected to drive more adaptive insights, automation, and recommendations related to both, as described herein. Based on this captured data above, an improved metric suite, including and expanding on the basic cycle time analysis can include per-agent metrics to report on, for example, average time taken by a given agent to process invoices through a specific stage. These metrics can further tie into invoice work queues and the assignment of work to individual agents, based on, for example a given agent's proclivity towards processing invoices at specific stages. The ability to tie high level performance indicators (e.g., cycle time averages) to more granular metrics relating to process stages, departments, or individual agents will drive improved visibility and hence the opportunity for process improvements and increase uptake of recommended improvements.

Invoice process analysis works generally by generating, storing, and providing access to data relating to how individual invoices and other requests move through the process as logged by the procurement processing system 200, as illustrated for example in FIG. 1. As the invoices move through the stages of procurement processing, the system may log information associated with how the invoice is handled. This logged information can include, for example, when the invoice enters and exit individual stages, what agents(s) interacted with the process and the interactions had, the amount of time an individual agent was interacting with the invoice, etc. The logs can be generated at a highly granular level. The processing insights system accesses these activity logs to determine process flow quality via specific metrics and recommend improvement opportunities.

Figure 3:
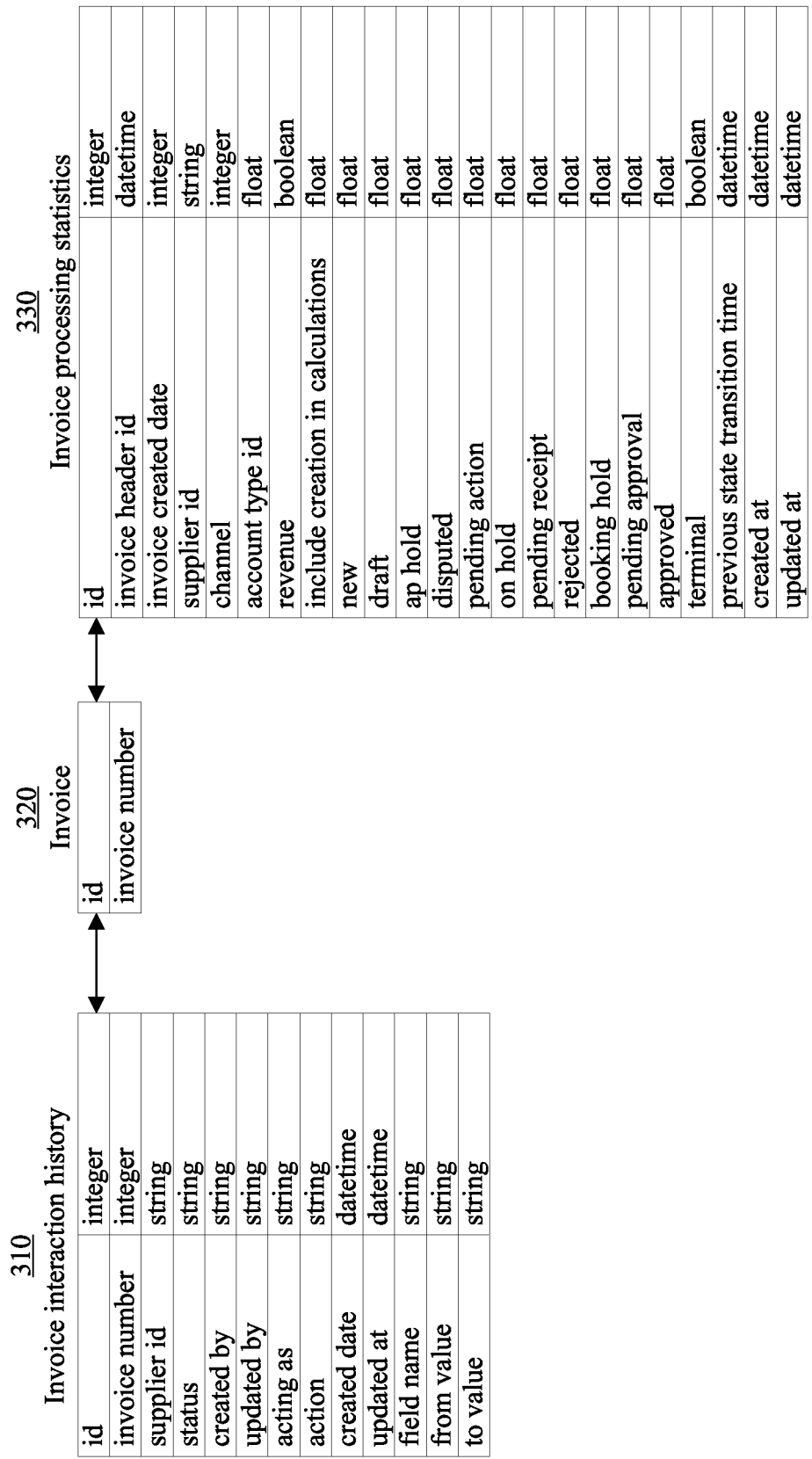
FIG. 3 illustrates an example schema of a datastore used to track information relating to invoice interactions.

FIG. 3 illustrates an example schema of a datastore used to track information relating to logs of invoice interaction history. FIG. 3 illustrates, in particular, the relationship between an invoice interaction history table 310, an invoice table 320, and an invoice processing statistics table 330. The invoice interaction history table 310 can be used to store information that is recorded relating to the flow of invoices through the procurement processing system 200. As illustrated, the metrics can be highly-granular, recording detailed agent-specific metrics for each invoice. The granular level of the metrics facilitates the determination and reporting of metrics such as the time an invoice spends active and idle in various stages of the process as well as an accounting the actions taken with respect to the invoice (including whether edits or revisions were deemed necessary or performed). The invoice interaction history table 310 can also be understood to represent an event history log that records the agent actions taken to cause state transitions of an invoice (e.g., the actions that caused an invoice to move between stages of the invoice review process). FIG. 4 illustrates an example instantiation 400 of the invoice interaction history table 310, with sample values to illustrate the range of potential values for the schema illustrated in FIG. 3. Like-named values in the invoice interaction history table 310 and the instantiation 400 illustrated in FIG. 4 refer to like-named variables.

The table in FIG. 4 includes a field 405 for "Invoice ID" that is used for uniquely identifying the individual invoice in the procurement processing system 200. The field "Invoice Number" 410 includes a name for the invoice assigned by the customer. The field "Supplier" 415 identifies the company that issued the invoice to the customer. The field "Status" 420 indicates the current state of the invoice, for example, whether it is new or has been recently created, whether it is currently being drafted or revised, whether it is under review, whether it has been assigned to a reviewer but is not currently under active review, etc. The field "Created By" 425 indicates the user who created the invoice (e.g., entered the invoice into the procurement processing system 200). Additionally, the data may include the method by which the invoice was created (e.g., by the customer through an API or web interface, by a reviewer based on a paper copy or other hard copy, directly into the procurement processing system 200, etc.). The field "Updated By" 430 lists the reviewer who last took an action on the invoice. The field "Acting As" 435 describes what role the agent listed in "Updated By" was acting as. The field "Action" 440 lists the action taken. The field "Created Date" 445 lists the time the invoice was created, which is useful for tracking the total cycle time. The field "Updated At" 450 lists the time that the action listed in the "Action" field was taken. As described further herein, fields 455, 460, and 465 are used to track, at a granular level, the updates to the table by the agents that may interact with a given invoice. The "Field Name" field 455 can be used to identify data of the preceding fields, or other information associated with an invoice (e.g., stored in association with the invoice file 320) that has been modified by an agent. The "From Value" field 460 can be used to identify what the previous value was prior to modification, while the "To Value" field 465 can be used to identify precisely what the value was after modification.

As shown in the table in FIG. 4 actions taken by a review agent are recorded as well as the authority or responsibility with which they were acting. The "Acting As" field 435 describes what the agent is acting on an invoice as. As an example, the Acting As field can include roles such as "Creator", "Submitter", "Approver", "Reviewer", or "Requester". Creator is the role used when a user submits the invoice. Submitter is the role of the user who submits an invoice from New/Draft status successfully which sends the invoice into the processing queue. Approver is the role in which an agent can approve or reject an invoice in Pending Approval status. An Approver also has the status to edit invoices. Reviewer is the role in which an agent can finalize review of an invoice after it has been approved by an Approver. Requester is the role of the agent mentioned, for example, on the invoice header or the back line agent who assumes the Requester role.

Actions are steps performed by agents that the system will track for process insight analysis for computer-implemented business processes. In particular, the tracking involves analyzing edits to the fields of data. The following table lists example actions, whether they must be specifically tracked by the system, and whether the action can be inferred from state transitions of the invoice. In some embodiments, these actions are tracked with respect to specific users and stages. In some embodiments, the actions are tracked irrespective to the particular user and stage. Information about actions that must be specifically tracked can be updated when the responsible agent submits work relating to that task. Information about actions that can be inferred from state transactions can be updated when the status of the invoice changes. Additional insight categories can be developed that may, for example, determine information from external sources or by analyzing state changes in larger amounts or groups.

| Action | Needs Tracking | Derived from transitions? |
| --- | --- | --- |
| Create | Yes | |
| Submit | — | Yes |
| Release Hold | — | Yes |
| Revalidate | Yes | |
| Bypass Approvals | Yes | |
| Approve | | Yes |
| Reject | | Yes |
| Withdraw | Yes | |
| Withdraw from Dispute | Yes | |
| Hold (Approval) | Yes | |
| Skip current approver | Yes | |
| Void | | Yes |

The status or stage of the invoice is also tracked on a granular level. The timing of status transitions can be used to provide insights relating to potential time impacts of steps within individual phases. As discussed above, in prior systems, granular details about the actions making up an invoice status was not available and not tracked. In certain embodiments, the status information can be reported at the same level of granularity. However, this may not be useful for all levels of report data. For example, a process manager may only need to know the rough estimates on a per-stage basis to evaluate department-level efficiencies. In such an example, the system will support grouping based on predefined levels or as customized. Additionally, grouping statuses into phases allows for similar activities to be compared across departments, customers, or regions by creating a common language for comparison and assessment. Grouping status into phases also accounts for workflow customizations performed by different customers or departments. For example, different customers may choose to perform or analyze different process variations that will not affect a status but will affect the phase performance overall. Thus, group provides an opportunity to determine which process choices are material to that phase. As described herein, this can lead to recommendations of workflow changes or enforced workflow changes for performing an analysis in a structured manner.

| Status | Stage/Phase |
| --- | --- |
| New | Creation |
| Draft | Creation |
| AP Hold | Review |
| Pending Action | Review |
| Pending Receipt | Review |
| On Hold | Review |
| Pending Approval | Approval |
| Booking Hold | Review |
| Approved | Terminal |
| Rejected | Review |
| Disputed | Not tracking |
| Voided | Terminal |
| Abandoned | Terminal |

In the system described, the above-described data is all associated with timestamps and attributed to individual agent activity (as well as necessary hierarchical information) before being logged and/or provided to a data insights module (e.g., data insights module 230) for future analysis and community-level insights. In particular embodiments, the attribution information may be anonymized or de-identified before provision to the data insights modules. The attribution information may also be treated after analysis by the data insights module.

In particular embodiments, the data for each invoice may be stored in a datastore holding information associated with each information. As an example, the invoice processing data may be associated with the invoice based on the unique invoice identifier assigned to the invoice. To access the invoice processing data for a given invoice, the datastore for the invoice processing data need only index using the unique invoice identifier. As described previously, FIG. 3 illustrates an example of the datastore schema and association between the invoice information 320 and the invoice interaction history 310 and invoice processing statistics 330.

As shown in the exemplary table of FIG. 4, time spent in each of the statuses can be stored in the respective row, per invoice. There can be one record in the table per invoice. Whenever the status for the invoice changes, the status change will be captured along with associated details and entry is made or updated in the invoice processing statistics table 330. Using an after-save event, the system can track the status changes, and the time spent in each of the status, thereby updating the section for each status in the table. The system stores time spent in each of the states by the invoice which is being monitored. In particular embodiments, the value stored for invoice states relates to the amount of time that the invoice spent in that particular state, precalculated based on the time when the state is changed and the datetime associated with the "previous state transition time" key. In particular embodiments, the value stored for invoice states may be a datetime that stores the time when the state transitioned into or out of that state. The system may use precalculated times to speed up retrieval time and simplify processing when, for example, presenting graphical representations of time-in-processing. As described herein, the time spent in each state can also be combined per phase before reporting. Additionally or alternatively, any other states which invoice is transiting into, will be ignored. The invoice processing statistics table 330 is updated with a new invoice record on creation of a new invoice in the system. This also initiates the time that the invoice in the processing queue. All the other changes in status are captured with updates.

In addition to capturing the time spent by an invoice at each stage of the review process, additional values relating to the change in status and related invoice attributes will be stored and provided to the data insights module for further processing. The captured data include the starting time of an invoice status before transition, the starting time of an invoice status after transition, the agent affecting the transition, the responsibility of the agent making the transaction, the action performed, and the time of the action. The invoice interaction history table 310 stores changes to this information in state transition, as described herein, along with the attribute changes at invoice level. When an action is performed, and if that action causes the state transition, the system stores the action that was responsible for that state transition, along with the "acting as" of the agent that caused the action.

Additionally, or alternatively, the invoice interaction history table 310 can be used to track status changes through the include of additional rows. As illustrated, the invoice interaction history table 310 can include multiple fields per invoice, with each field representing a change in information, typically change in status. In this embodiment, the "field name" record is used to indicate the value that was changed, the "updated by" record is used to indicate the agent responsible for the change, the "from value" field is used to indicate the previous value while the "to value" field is used to indicate the subsequent value. In this approach, the invoice interaction history table 310 provides a highly granular accounting of the activity with respect to the invoice, which is ripe for mining for insightful data.

The schema for the structure of the data store illustrated in FIG. 3 and FIG. 4 reflects an improved method of storing the interaction history data in a manner that is highly indexable and searchable, to facilitate the creation and discovery of advanced agent, customer, and community metrics, but also flexible and auditable, to facilitate the granular review of an agent's or customer's performance even down to individual invoices if needed. As described herein, the organization of the data stored in the interaction history table has a different structure than before, and interoperates with the programmed techniques previously described, in a different manner than before, to provide a powerful new tool in generating the metrics described herein.

To assist managers in reviewing this data, the information can be presented in an interactive user interface. The user interface can facilitate the manager in identifying overall trends, for example time spent by invoices in individual statuses or phases. The user interface can also facilitate the user analyzing an individual invoice to see where that invoice compares to others and identify, for example, a bottleneck in the process caused by a particular agent. Other interfaces can include a graph for overall invoice cycle times, with the height of the bar graph representing average process time taken for an invoice on the buyer side (e.g., time in New or Draft status for internally-entered invoices and post submit time until approved or in a terminal status). The user interface can support filtering for fields stored in the invoice interaction history table 310 and invoice data, such as filters for supplier, accounts, and channel. These filters will reduce the default result set from all records to only the ones that match all the criteria.

A further interface for analysis can include agent-level statistics, such as agent average processing time. Agent average processing time includes time taken by processing agent or buyer side user to create an invoice (e.g., via a web interface, API, or invoice inbox) until the time it took for the invoice to be approved. The review may include in-process invoices (e.g., invoices that have not been assigned a terminal status) over a set time frame. The review may include time spent in each phase for all invoices in a terminal status (e.g., Approved, Voided, Abandoned) created in a given period of time. As invoices can be submitted in a variety of manners, the time of invoice processing starts at different points. E-invoices the clock starts at the moment they arrive in a submitted status. For manually-entered invoices, the creation time can be the start of time tracking. Invoice inbox entries should begin tracking from the date received.

As an example, an "overall processing time" interface can be provided comprising a graph with multiple bars indicating the processing time broken down, for example, by account, supplier, etc. The interface can include interactive element such as hover effects, where a user can hover an indicator over the bars to reveal additional statistics, such as the average time from creation to terminal state for invoices created in a defined period of time; a total count of invoices created in the period of time, total value of invoices created in that period of time, time taken by invoices to progress through each phase or invoice state, and other related data described herein. The interactive elements may include a method of filtering the data, e.g., based on period of time, account, agents that touched invoices, and all other manner of values stored in the invoice interaction history table 310 or invoice processing statistics table 330.

Additional interfaces can be created to facilitate review of the procurement processes as a whole. For example, totals for invoices processed or in processing for a customer can be calculated. The time invoices spend in individual phases can be determined on a customer-basis. Total number of invoices created, reviewed, and approved, total value of the invoices, overall average process times for invoices created during a given period can all also be provided.

In particular embodiments, the interface for a user to review the collected invoice status time can include two parts, a graph and status processing time information. To represent the graph data on the page, the system can render a graph which include time along the x-axis and different types of averages along the y-axis. The time on the x-axis can be continuous or quantized according to user selection. The range of time can also be targeted to a range of interest for the user. Example averages shown on the y-axis can include a vertical bar block to show total time in the lifecycle on average for invoices in a period of time (e.g., per month), and time spent in any of the distinct phases (e.g., creation time, review time, approval time, etc.) among others. As described herein, the data used for these graphs can be pre-calculated at time of generation to improve performance of the graph generation tasks. Additionally or alternative, customized graph data can be generated on-demand.

To calculate the data points for graph plotting, the invoice data is first retrieved for the target period of time by querying the invoice processing statistics table 330 for each section. When an invoice leaves a state the time it spent in that state is attributed to the invoice and the state. Note that when the invoice is marked as submitted for approval, the creation time may be reported as 0 to facilitate filtering, as there is no analysis needed in this case. Various filters can be supported. For example, to filter data by supplier, the supplier id is identified. Then a filter query is used for the invoices matching that supplier id. As another example, to filter the data by chart of account, the account type id is identified. Then a filter query is run for those invoices for the account type id matching the selected chart of account. As another example, to filter by period of time, a user selects a period of time of interest. A filter query is run for the invoices with creation date during that period of time. This filter may use a default value, e.g., previous 12 months, for users that do not specify a value. As another example, to filter invoices by channel (e.g., how the invoice is submitted), once the channel of interest is identified, a filter query is run for those invoices matching the filtered channel.

Typically, a customer lead is responsible for meeting certain standards for invoice processing timelines and ensuring that invoices are on track for timely payment. This management requires many activities to be coordinated, including monitoring, routing, and troubleshooting incoming invoices and overseeing timely approvals. Today, customers do not have a clear view of agent performance and efficiency statistics and are therefore blind to gains or opportunities to improve their computer-implemented BSM processes. This leads to waste in the form of unrealized reduction in spending related to approving invoices. Additional forms of waste include the allocation of finite computing resources (e.g., CPU processing time and cycles, computer memory, non-volatile digital storage, network bandwidth, and other computing resources) where more efficient processes would have otherwise allowed for those resources to be put to more productive use. Particular embodiments relate to the following techniques to improve customer visibility in their processes on a quantitative and qualitative level by comparing invoice processing benchmarks across peers, analyzing invoice work processes at a user (individual agent) level to track individual performance in terms of time efficiency and quality of work, and facilitating active workload management, e.g., the ability to determine issues for in-process invoices and realign assignments and priorities or otherwise modify the workflow and resources allocated to it. This allows the customer to view phase-wise processing time compared with community metrics. Additionally, this allows for automated correction of misuse of resources, resulting in improved operations of the computing systems supporting computer-implemented BSM processes by more accurately distributing the workload according to a measured need and not just to a predicted use. These techniques further provide a view into agent-specific performance such as time required to process invoices through different stages and frequency that invoices require rework of some sort. Analysis of invoice rework can include the ability to identify the source of the rework needed (e.g., whether driven by the invoice processing personnel, invoice submitter, or even the supplier). In certain embodiments, the customer lead can manage assignment of invoices to specific agents based on real-time metrics.

Built on the process analysis tools described herein, the procurement processing system 200 can evaluate and present a variety of advanced metrics that may be useful for determining the performance of, for example, a customer process and individual agents or departments that interface with the process. In addition, the metrics can be used to compare the process and agents to benchmarks relating to, for example, the performance across multiple customers of the procurement processing system 200. The comparable benchmarks can be tailored to the particular industry of a particular customer or can be otherwise filtered to be appropriate to create a comparable "community" of customers. These filters can include, for example, the industry, the size of the customer, the revenue of the customer, the size of the invoicing department, the volume of invoices processed over a set timeframe, the value of invoices processed over a set timeframe, or any other suitable filter or combination of filters.

The data to be used to generate and present the benchmarks and insights can be derived from at least two sources: instance-level data and community-level data. The instance-level data can be sourced from, for example, the invoice processing statistics table 330 described herein. Community-level data can be created from the instance-level data by de-identifying the instance-level data collected for individual customers and collecting that data as appropriate. As an example, a datastore can be maintained that includes processed community-level data to allow for efficient retrieval of community-level benchmarks on demand. The metrics stored by the datastore can be updated on a regular basis (e.g., during a regularly-scheduled batch process), can be updated on-demand, or can be continuously updated as new instance-level data is made available. As an example, only, and not by way of limitation, the community invoice processing data can include data such as, for one or more customers, the count of invoices that have reached a terminal status (e.g., approved or rejected), the total time spent by invoices on the invoice creation phase (e.g., in hours), the total time spent by invoice on the invoice review phase (e.g., in hours), the total time spent by invoices on the invoice approval phase (e.g., in hours), and other suitable metrics. To facilitate community-level benchmark metrics, data stored relating to community activity can include a count of invoices that are created, a count of invoices that are reviewed, a count of invoices that are approved, a count of agents who spent time in the creation phase of invoices, a count of agents who spent time in the review phase of invoices, a count of agents who spent time in the approval phase of invoices, and other suitable related metrics.

Agent-level metrics can be generated based on the additional collection of agent-level data. The agent-level data can include the number of invoices touched, the phase or activity performed, and the amount of time spent per invoice touched. This data can be collected from instance-level data and stored into an agent invoicing metrics datastore (e.g., user-level datastore 223). In particular embodiments, the data may be collected for a defined, limited window for time. This timeframe can be divided into equal time periods for presentation. For example, agent-level metrics may only be maintained for the previous 12 months, 6 months, 3 months, etc. To ensure that all relevant data for a timeframe is reported, only full time periods for which data is available may be included (e.g., the current month may not be included as it has not yet been completed). In the datastore, to increase the speed of retrieving data for analysis and presentation, agent activities may each be recorded into a separate row of a relevant table. Agent activities may also be separated by the relevant time period (e.g., per-agent, per-month). In addition, the date of attribution of an activity can be adjusted according to customer preference or as needed to ensure adequate levels of performances. For example, the date of attribution of an activity can be assigned to the actual date (e.g., a reviewing activity can be assigned to the month in which it occurred). Alternatively, the date can be attributed to the date on which the invoice is created or terminated to ensure uniformity in the number of invoices available for processing (e.g., an invoice may only be used to calculate metrics of any kind once it has reached a terminal state). The same invoice can be touched by multiple agents, even during the same stage. For example, an invoice may have multiple reviewers working on it. In particular embodiments, the actual time spent by each reviewer on the invoice is counted towards that reviewer. Alternatively, the total time spent by all reviewers can be attributed to each reviewer.

The data calculated for reviewers can be based on the timestamps stored in association with each state transition, e.g., in the invoice processing statistics table 330. Once an invoice has reached a terminal state, and once the invoice processing data is ripe for analysis, the state transitions can be analyzed to calculate the duration of time spent on each section by each agent who worked on the invoice. In particular embodiments, the data can be processed on a regular basis. For example, a regularly-scheduled batch job can identify all invoices that have reached terminal states (e.g., approved, voided, abandoned, etc.) since the conclusion of the previous batch job. A table in the user-level datastore 223 can then be updated from the invoice processing statistics data. Additionally or alternatively, the invoice processing statistics data can be processed on-demand. For example, when a manager wishes to access agent (or community) metrics, the procurement processing system 200 may identify un-processed data since the last time a manager affiliated with the customer requested metrics. The system can pull the customer-related invoice processing statistics data and process it accordingly. Additionally or alternatively, the invoice processing statistics data can be processed continuously, with the agent invoicing metrics data being continuously updated as invoices newly reach a terminal status. The agent-level metrics can be archived and preserved to allow for historical data analysis.

The following table illustrates and defines an example subset of the type of data that can be stored in the agent invoicing metrics table for each agent and for each relevant period of time. This listing is meant by way of illustration only and not by way of limitation. In the below table, the "projected time" referenced for the "delayed created invoices", "delayed review invoices", and "delayed approval invoices" may refer to a service level agreement timeframe expected for delivery of review of invoices by the customer. The projected time may be configurable and may be customizable for each customer, department, or reviewer.

| Value | Type | Description |
| --- | --- | --- |
| Agent id | integer | Unique identifier of agent working on an invoice for this collection (used, for example, to tie data historically) |
| Reporting date | date time | Date/Time of the processing and reporting of this data |
| Creation time | float | Duration agent spent working on creation phase of invoices |
| Review time | float | Duration agent spent working on review phase of invoices |
| Approval time | float | Duration agent spent working on approval phase of invoices |
| Delayed created invoices | integer | Number of unique invoices agent spent over projected time working in any creation state |
| Delayed review invoices | integer | Number of unique invoices agent spent over projected time working in any review state |
| Delayed approval invoices | integer | Number of unique invoices agent spent over projected time working in any approval state |
| Invoices created | integer | number of invoices created by agent that reached terminal states |
| Invoices reviewed | integer | number of invoices reviewed by agent that reached terminal state. |
| Invoices approved | integer | number of invoices approved by agent that reached terminal state |
| Invoices touched | integer | number of unique invoices worked on by agent |
| Invoices rejected or withdrawn | float | number of rejected or withdrawn invoices created by agent |
| Total invoices created | integer | Number of invoices created by agent |
| Average creation time | float | Creation time ÷ Invoices created |
| Average process count | float | Invoices touched ÷ time in reporting period (e.g., days in month) |
| Average creation count | float | Invoices created ÷ time in reporting period |
| Averaged review count | float | Invoices reviewed ÷ time in reporting period |
| Average approval count | float | Invoices reviewed ÷ time in reporting period |
| Reworked rate | float | Invoices rejected or withdrawn ÷ Total invoices created |
| Delayed for creation rate | float | Delayed created invoices ÷ invoices created |
| Delayed for review rate | float | Delayed review invoices ÷ invoices reviewed |
| Delayed for approval rate | float | Delayed approval invoices ÷ invoices approved |
| Average wait in review | float | Review time ÷ invoices reviewed |
| Average wait in approval | float | Approval time ÷ invoices approved |

To review the individual agent metrics, the procurement processing system 200 can provide a variety of user interfaces that allow for a manager to identify and review data for each individual agent. As an example, a manager can review a table interface, which shows the manager the agents for whom data is available and high-level summary information, such as the creation time, review time, approval time, and invoices touched metrics. The manager can then select an individual agent to review that agent's metrics in more detail. Additionally, the procurement processing system 200 can provide an interface allowing the manager to directly compare agent metrics for multiple agents simultaneously by selecting the agents of interest and the metrics of interest. The procurement processing system 200 can provide a historical record of some or all of the metrics discussed previously.

In particular embodiments, the procurement processing system 200 can provide graph-based user interfaces that track agent metrics over a period of time. The graph-based user interface (and table interface) can be highly customizable. For example, the manger can filter the data included in the graph-based user interface based on selecting individual agents, departments, stages of review, responsibilities, tasks, date and time range, and any other suitable metric. The graph-based user interface can adapt to the manager's selection in real-time by either filtering the retrieved data (where the data is precomputed) or by performing new calculations to generate the review metrics. As an example, the graph-based user interface can first appear with a variety of canned filters, for example highlighting the time spent in different invoice processing stages. The canned filters can be modified or updated by the user to allow the user to customize the dashboard to items of interest to them.

In particular embodiments, access to the agent metrics interfaces can be limited according to users with sufficient permission levels. For example, an individual user can be permitted to view their own metrics but cannot view metrics evaluating the performance of other agents. As another example, a customer team lead may be permitted to review metrics for designated users on their team, but not outside their team. Customer managers can be permitted to view all relevant metrics for the customer (but not other customers).

Agent metrics, especially when recorded at the granular level afforded by the procurement processing system 200 as described above, can be used to improve the workflow for invoice processing and to improve distribution of work amongst agents (manual or automated) on customer teams. For example, the average time taken by a agent to process invoices is important for activities like capacity planning, measuring the success of workflow or configuration updates. It has been observed that customers set up with dedicated teams for invoice entry often focus on reporting for the review phase as an indicator of performance and quality. In contrast, decentralized teams often focus near-equal attention on all three phases.

As mentioned above, the data gathered by the procurement processing system 200 and stored in the invoice processing statistics table 330 can be used to record and track community-level metrics. These community-level metrics can provide a reliable benchmark for customer managers who otherwise have no largescale baseline for evaluating the efficiency of their procedures and of their agents. As an example, metrics, described herein, can be developed to allow a customer to compare their average processing time (e.g., from creation to termination) against industry peers or to compare the processing time for an individual phase across the entire community of agents of the procurement processing system 200. In particular embodiments, it will be advantageous to de-identify, anonymize, or aggregate the data before it is made available so that confidential business information is not incidentally disclosed. To ensure customer confidence, the community-level metrics may be an opt-in only feature, where a customer's data is not analyzed and included in community metrics absent their permission. These metrics can serve as a benchmarking guide for process owners to strive for better if they're not the leaders.

Community-level benchmarks are calculated on a per-instance basis based on the invoice processing statistics for each agent. For example, each agent in an instance has a total overall cycle time, creation time, review time, and approval time over a preceding defined period of time (e.g., 24 months, 12 months, 6 months, etc.). This data can be provided to the data insights module 230 for aggregation across the community. As described herein, there are a variety of ways to determine community benchmarks. For example, the community values for a given metric can be selected as the mean or median value of all values calculated for all customers. However, certain anomalies may enter the data which must be accounted for. Similarly, benchmarks can be selected based on a collection of top performers across the community. For example, the benchmark can be set at the highest or lowest values for a metric (according to the metric) or for an average of the top number or percentage of values. The performers (and benchmarks) may optionally be customized by the customer (or for the customer by the procurement processing system 200) so that customers are able to compare themselves to their peers to determine appropriate benchmarks to which to strive.

The following table illustrates and defines an example subset of the type of metrics that can be calculated, stored, and presented for the community-level metrics. This listing is meant by way of illustration only and not by way of limitation. In the below table, unless noted otherwise, the calculations may be performed on invoices in a terminal state to ensure that accurate data can be reported. In particular embodiments, the data may optionally include in-process values as a separate category or they may be included. Although many of the metrics reference accounting for the number of days elapsed, in particular embodiments, that time period may be customizable based on community or industry preference, or even for the individual customers. In such cases, the community-level metrics may be recalculated on-demand as the time period values change. In the below table, the "projected time" referenced for certain metrics may refer to a service level agreement timeframe expected for delivery of review of invoices by the customer. The projected time may be configurable and may be customizable for each customer, department, or reviewer.

| Metric Definitions | |
| --- | --- |
| Invoice Process > Processing Time (Community) | |
| Creation | Time for community leaders in the creation phase. (Total time in the creation phase for all invoices) ÷ (Total count of invoices) |
| Review | Time for community leaders in the review phase. (Total time in the review phase for all invoices) ÷ (Total count of invoices) |

-continued

| Metric Definitions | |
|---|---|
| Approval | Community leaders' time for the approval phase.<br>(Total time in the approval phase for all invoices) ÷ (Total count of invoices) |

Invoice Process > Processing Time (Instance Level)

| | |
|---|---|
| Creation | Average creation time for this instance<br>(Total time in the creation phase for all invoices) ÷ (Total count of invoices that pass through the creation phase) |
| Review | Average review time for this instance<br>(Total time in the review phase for all invoices) ÷ (Total count of invoices that pass through the review phase) |
| Approval | Average approval time for this instance<br>(Total time in the approval phase for all invoices) ÷ (Total count of invoices that pass through the approval phase) |
| Average Processing Time | Average end-end invoice processing time<br>(Total time from create to terminal status for all invoices) ÷ (Total count of unique invoices) |

Agent Metrics > Agent Metrics Benchmark (Community)

| | |
|---|---|
| Average invoices per agent per day: Creation | Invoices created per agent, per day for the instance<br>(number of invoices created by all agents in the time period) ÷ (Total days × all unique creator agents) |
| Average invoices per agent per day: Review | (number of invoices where a select agent is the submitter and acted on the invoice in any status of the "Review" phase in this time period) ÷ (total days × all unique reviewer agents) |
| Average invoices per agent per day: Approval | (number of invoices where a select agent is the approver and acted on the invoice in a Pending Approval status in this time period) ÷ (total days × all unique approver agents |

Agent Metrics > Overall Processing Time (Instance level)

| | |
|---|---|
| Average invoices per day per agent | (number of invoices processed over the time period) ÷ (number of unique agents touching invoices × total number of days in the period) |
| Average invoices created per day per agent | (number of invoices created over the time period) ÷ (number of days in the period × total number of unique creator agents) |
| Average invoices reviewed per day | (number of invoices reviewed over the time period) ÷ (number of days in the period × total number of unique reviewing agents) |
| Average invoices approved per day | (number of invoices approved over the time period) ÷ (number of days in the period × total number of unique approving agents) |

Agent Metrics > Invoicing Agent Metrics (Instance level)

| | |
|---|---|
| Average Processing Time | (total time invoices waited for a select agent in any phase over the period) ÷ (total number of invoices actioned by the agent over the period) |
| Average Creation Time | (total time invoices waited before a select agent moved an invoice in creation phase to the next state over the period) ÷ (total number of invoices created by the agent over the period) |
| Average Processed Count | (total number of invoices processed across creation, review or approval by a select agent over the period) ÷ (number of days in the period) |
| Average Creation Count | (total number of invoices created by a select creator over the period) ÷ (number of days in this period) |
| Creation: Reworked Rate | (total number of invoices created by a select agent over the period that were rejected or withdrawn) ÷ (total number of invoices created by the agent over the period) |
| Creation: Delayed | (total count of invoices created by a select agent that waited in the creation phase for more than a projected time) ÷ (total invoices acted on by the agent over the period) |
| Average Reviewed Count | (total number of invoices reviewed by a select agent over the period) ÷ (number of days in the period) |
| Average wait in Review | (total time invoices waited for a select agent in review over the period) ÷ (total number of invoices reviewed by the agent over the period) |
| Delayed in Review Rate | (total number of invoices that waited in the current status where a select agent was the reviewer over the projected time) ÷ (total invoices reviewed by the agent in this period) |

| Metric Definitions | |
|---|---|
| Average Number Approved | (total number of invoices approved by a select agent over the period) ÷ (number of days over the period) |
| Average wait in Approval | (total time invoices waited for a select agent in approval over the period) ÷ (total number of invoices approved by the agent over the period) |
| Approval: Delayed Rate | (total count of invoices that waited in pending approval status where a select agent was the current approval over the projected time) ÷ (total invoices approved by the agent in this period) |

As with the other invoice processing metrics and agent-level analysis, the community and community leader values can be provided in a variety of user interfaces ranges from reports of a customer's data to the relevant personnel in the customer's organization to interactive displays of charts and graphs that may be customized and filtered on-demand to assist the user in reviewing the data. As an example, a report or interface can be selected to maximize the ability of the user to compare their own performance (or the performance of their organization) against the community as a whole and/or community leaders. Thus, for each of the applicable metrics discussed above, the user may be presented with their own average values over a defined period of time presented near the community average and community leader values. This can be presented in a graph format, e.g., a line graph tracked the performance of the metric over time. Additionally, filters can be used to select metrics of interest and further facilitate review.

With the introduction of community-level data for analysis of various metrics, the procurement processing system 200 must determine a methodology for selecting the "leaders" for each metric use as benchmark or promote as best practices. As described herein, the data from these community leaders can be directly used to calculate various metrics. Additionally, practices from community leaders may be specifically analyzed to determine what practices are transferrable to other customers. However, the underlying metrics used in identifying community leaders often contain outliers that must be filtered out in order to arrive at reasonable benchmark values. Finding and removing these values can be complicated as the metrics do not necessary adhere to a standard or predictable value.

Figure 5A:
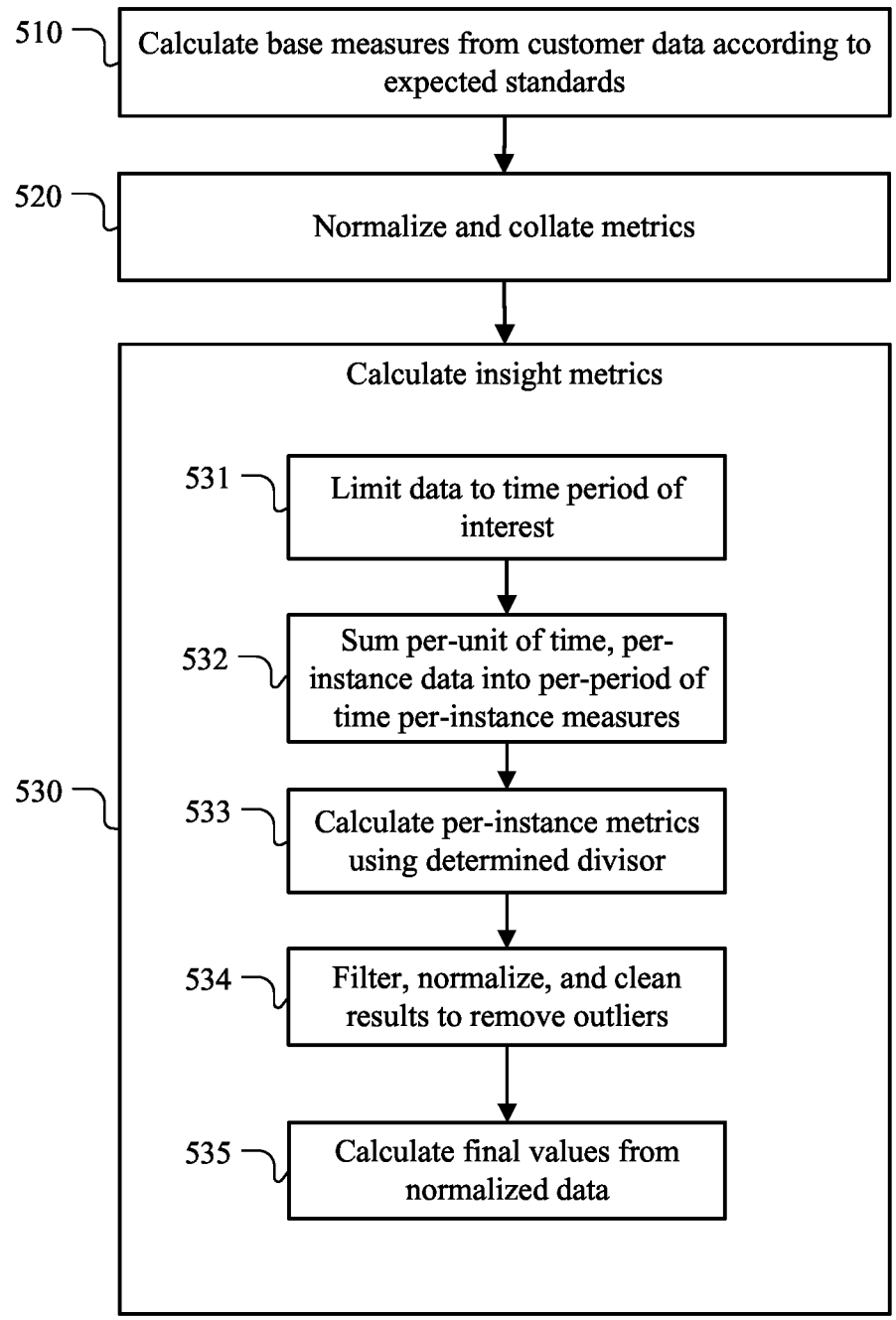
FIG. 5A, FIG. 5B illustrates an example method for identifying community leader metrics.

First, a brief explanation of how certain community leader metrics are identified and used will help explain the motivation for the advanced refactoring techniques described herein. FIG. 5A illustrates a first process 500 for identifying community leader metrics. The process insights analytics process operates according to three phases. In phase one, at step 510 the system calculates the base metrics according to expected standards. For example, the system may calculate the base metrics on a per-instance, basis for a preferred period of time (e.g., one month) for each geographical region of interest (e.g., to appropriately segment the data for community analysis as different geographical regions may have different business practices that would otherwise skew the community-level data). This segmentation and calculation process results in files corresponding to each region, where the file consists of rows corresponding to the instance name, the date, and approximately the data used to calculate the metrics of interest (e.g., number of invoices, number of invoices on contract, etc.). In phase two, at step 520, the regional files are normalized and collated into a single file for analysis. For example, currency is converted to a single currency (e.g., USD) and instance metadata, such as industry, production date, customer size, etc., is joined. In the third phase, at step 530, the insight metrics are calculated. This phase includes a multi-step process beginning with, at step 531, limiting the data to the time period of interest (e.g., the most recent 12 months). Then, at step 532 the per-unit of time, per-instance data measures are summed into per-period of time per-instance measures (e.g., monthly per-instance data is summed into annual per-instance data). Next, at step 533, per-instance metrics are calculated by carrying out the appropriate divisions. For example, percent of on-contract invoices equals number of on-contract invoices divided by the total number of invoices. Next, at step 534 the metrics are filtered, normalized, and cleaned to remove outliers and arrive at a final set of data points. Finally, at step 535, the final per-industry and overall metrics are calculated from the remaining data points.

Refactoring refers to the process of filtering, normalizing, and cleaning the per-industry data to remove outliers. In one embodiment, a refactoring approach uses a set of floor values to filter out undesirable values. This refactoring approach may also be referred to as the leader selection mechanism. Consider the following data, the output of step 533 above, where the metric value are given as percentages for ease of comparison. Note that the metric value could be any suitable reported metric value:

| Instance | Metric value |
|---|---|
| A | 105 |
| B | 100 |
| C | 97 |
| D | 94 |
| E | 80 |
| F | 30 |
| G | 10 |
| H | 0 |
| I | −3 |

Plainly, this data includes outlier values, for example percentages greater than 100 (corresponding to instance A) and negative percentages (corresponding to instance I). The insight process must filter out inappropriate values and select the data points that allow the system to calculate accurate final metrics. Extreme outlier values can be caused by many sources. Consider the following example: While calculating invoice approval times a customer instance is identified with low approval times. Thus, the customer instance may be flagged as a good candidate for selection as a community leader for metric calculations. However, on closer examination it appears that some of the approvals are carried out externally and inserted into the procurement processing system 200. This results in a near-instant approval time because the time between creation and approval is effectively 0. Therefore, after inspection, only a subset of the customer approvals represent actual approval times. Averaging the real values and the near-zero values results in a metric value that seems good, while their real-life approval times are not. Corner cases are common across the data. However, the sort of clearly incorrect values discussed in the examples above are only present in rare cases. Especially at large scales with real data, it is deceptively difficult to determine refactoring values that do not eliminate valuable data.

In one embodiment, the refactoring process (e.g., step 534) for removing undesirable values uses a minimum or floor value tuned for each metric based on experience with the metric. The floor values are carefully selected based on both internal and external benchmarks and studies, to be a reasonable representation of leaders in each category. In short, for each metric, a minimum acceptable value is defined and applied to the data. Any values below the floor value are artificially increased to be the floor value. Consider the data from above, with the filter value of 85:

| Instance | Metric value | Post Filter |
|---|---|---|
| A | 105 | 105 |
| B | 100 | 100 |
| C | 97 | 97 |
| D | 94 | 94 |
| E | 80 | 85 |
| F | 30 | 85 |
| G | 10 | 85 |
| H | 0 | 85 |
| I | −3 | 85 |
| Metric Value | | 91.2 |

In this case, the values 80, 30, 10, 0, and −3 are replaced with 85. The post-filter values are then averaged to arrive at the final metric value for that metric, in this case 91.2

While this approach works for certain metrics, several issues can arise. First and foremost is that the values are artificial and essentially arbitrary despite best intentions. The use of the floor value drives the data towards an artificial number instead of reflecting the real state of the metric. Another issue is that over time, and particularly with the inclusion of more customer instances, the metric numbers may trend towards the filters, meaning most or sometimes all of the data points were below the floor value, resulting in the metric simply being the floor value. This renders the metric valueless.

Another embodiment of the refactoring process uses percentile-based analysis for refactoring. In this approach, the process involves first, at step 540 removing invalid and unreasonable values by filtering out records with value less than an absolute floor (e.g., 0.05% for percentage-based values or less than 0.05 hours for time-based metrics) or greater than an absolute maximum (e.g., 100% for percentage-based metrics or 100 days for time-based metrics). This first step is removes instances that are not participating in that metric or that had such a low submission rate for the metric that it would skew the data. Next, at step 542, the system identifies a best percentile of the remaining values as a filter, for example the highest or lower quartile, quintile, etc., as appropriate. Then, at step 544, the procurement processing system 200 determines if there are enough post-filter values remaining to calculate a meaningful community metric, as described below. If there are a threshold number of values or data points remaining, at step 548 the remaining post-filter values are used to arrive at the final metric value. Finally, at step 549, the final metric value is stored and prepare for presentation.

Applying this process to the above example yields the following:

| Instance | Metric value | Hard Filter | Quartile |
|---|---|---|---|
| A | 105 | | |
| B | 100 | | |
| C | 97 | 97 | 97 |
| D | 94 | 94 | 94 |
| E | 80 | 80 | |
| F | 30 | 30 | |
| G | 10 | 10 | |
| H | 0 | | |
| I | −3 | | |
| Metric | | | 95.5 |

In the data, the values of 105 and 100 were removed by the high filter and the values 0 and −3 were removed by the low filter. The top quartile (25%) of the remaining values were then averaged (97 and 94) to arrive at the file metric value, 95.5.

Many methods for calculating benchmarks are prone to exposure to the issue of data sparsity: a lack of data points to calculate robust values for all metrics, particularly as aggressive filters are used for categorically invalid values. Data sparsity is exasperated by the further splitting of data points into industry slices. Particularly for expense-oriented metrics, when data is sliced (e.g., by industry), the top values can end up with a lower than statistically ideal number of data points. For these cases, the procurement processing system 200 may determine at step 544, that an insufficient number of values remain for a meaningful metric to be calculated. The threshold number of value may be customizable to the industry and may vary based on the metric involved. For example, total processing time may require fewer data points than a time in review stage metric. If there are not enough values, at step 548, the industry-specific metric value can be added in a weighted average with the overall (e.g., all industries) metric value. As an example, the industry-specific metric where there are too few data points can be calculated as:

$$\text{weighted metric} = m_{all}\left(\frac{c_{all}}{c_{total}}\right) + m_{industry}\left(\frac{c_{industry}}{c_{total}}\right),$$

where
$c_{all}$ is number of data points for the cross-industry metric;
$c_{industry}$ is the number of data points for the industry metric (e.g., the metric with too few data points);

$c_{total} = c_{all} + c_{industry}$ $m_{all}$ is the value of the metric across data points
$m_{industry}$ is the value of the metric for the industry (e.g., the metric with too few data points).

Figure 5B:
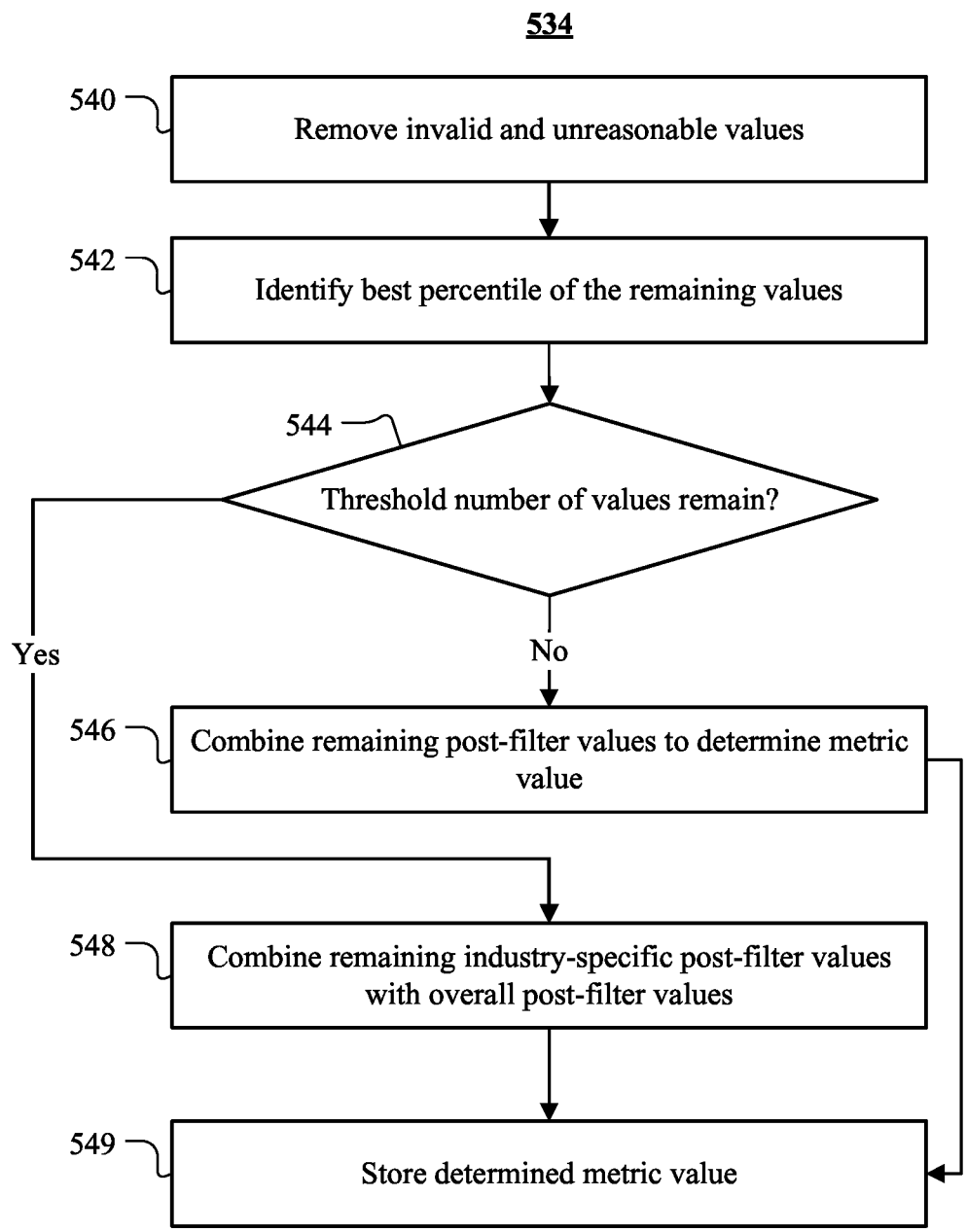

The dynamic approach illustrated in FIG. 5A, FIG. 5B and discussed herein have distinct advantage over previous methods for calculating a community metrics. First, the approach is inherently adaptable and adjustable to the real values of data. For example, there is no need for hard limits or hard-coded values to use for floors. The system instead can easily tune acceptable values to the industry, region, size of company, or even the metric itself. Additionally, the approach can accommodate many types of data within the selection of percentiles and filters to use to collect appropriate and accurate data. Furthermore, the approach is highly modular. For example, different refactoring values can be selected based on the data type, industry, geography, etc. These advantages and more result from the dynamic infrastructure of the refactoring approach. These advantages will also be reflected in improved operations of the procurement processing system 200, including the computing systems responsible for providing its operations. As an example, because the percentile-based calculation leads to more accurate community values, recommendations for, or modifications to, workflows based on the metrics are more likely to be based on accurate values. Thus, the changes in control features, changes in configurations, or allocation of computing resources (to name but a few examples) that result from the determination of community leader values, as described herein, are more likely to be closer to ideal recommendations than in the absence of the improved method for calculating community leader values for computer-implemented BSM processes.

Although this disclosure describes and illustrates particular steps of the method of FIG. 5A, FIG. 5B as occurring in a particular order, this disclosure contemplates any suitable steps of the method of FIG. 5A, FIG. 5B occurring in any suitable order. Moreover, although this disclosure describes and illustrates an example method for calculating community metric values including the particular steps of the method of FIG. 5A, FIG. 5B, this disclosure contemplates any suitable method for calculating community metric values including any suitable steps, which may include all, some, or none of the steps of the method of FIG. 5A, FIG. 5B, where appropriate. Furthermore, although this disclosure describes and illustrates particular components, devices, or systems carrying out particular steps of the method of FIG. 5A, FIG. 5B, this disclosure contemplates any suitable combination of any suitable components, devices, or systems carrying out any suitable steps of the method of FIG. 5A, FIG. 5B.

As described previously, the procurement processing system 200 can present agent, process, and community metrics to facilitate manual review of BSM processes by managers and supervisors. This review process can be used to identify potential areas of improvement and to determine strategies on how to meaningfully improve processes to, for example, reduce the cost of processing invoices, improve predictability of the timing between when an invoice is created and approved, improve predictability of the amount of time an invoice spends in each phase and state, manage staffing and work assignment for agents working on invoices, and achieve other benefits. However, this review process can be a labor intensive enterprise, requiring a knowledge of not just a customer's own metrics and possibly a community benchmark to determine what is possible, but also a knowledge of what modifications can be made and how they are likely to affect statistics. As an example, a manager may seek to reduce costs by reducing staffing on invoice processing. However, this may cause an increase in average processing time, or rework rate due to errors of overwork agents. There is therefore an opportunity for an additional improvement such as a recommendation engine for providing suggestions of modifications to BSM processes that is based on knowledge of past behavior and effects.

The procurement processing system 200 can use the data recorded in, for example, the invoice interaction history table 310 and invoice processing statistics table 330 (in addition to all other relevant data, not limited to just the metrics described herein) as a basis for providing recommendations for potential modifications to computer-implemented BSM processes. As an example, the procurement processing system 200 can be configured with a set of rules for determining when certain types of modifications may be advantageous for an individual customer or agent to apply to a computer-implemented BSM process. Additionally or alternatively, the procurement processing system 200 may include additional modules, such as a recommendation engine, configured to handle generation and presentation of modifications of BSM processes. As an example, a rule programmed into the procurement processing system 200 (or a recommendation engine as appropriate) can detect when one or more agents responsible for actions in a workflow perform a threshold number of actions that can be used to indicate a target customized by the customer for an indication that another agent should be assigned to the workflow. As another example, a rule programmed into the procurement processing system 200 can detect when an individual agent's delayed in review rate exceeds a threshold and recommend evaluating the qualitative performance of the agent or the agent's supervisor. Rules can also be used to automatically compare a customer's metrics against community metrics and recommend modifications based on a community leader's workflow.

As another example, the procurement processing system may use the data to train machine-learning processes to provide recommendations and/or to evaluate computer-implemented BSM processes as they are being used. In particular embodiments, the procurement processing system 200 may train machine learning models to identify best practices by retrieving the data associated with customers who are selected as community leaders in one or more metrics. The data can be mined to determine, for example, the structure of the invoice processing teams, workflows, and incentives. As an example, training data can be developed from the processing times invoice agent interaction history data. With the trained machine learning models, the system can compare other customers' performance metrics against the metrics of community leaders. The trained models can be used to identify areas of improvements, including staffing changes, areas for automation, or additional products offered by the procurement processing system 200 that can be used to increase efficiency in the invoice processing workflows and consequently efficiency in the procurement processing system by virtue of its role in the execution of steps of the workflow. Similarly, other computing devices involved in the workflow can be made more efficient through their role in the execution of steps of the workflow.

These recommendations may be provided to customers automatically or on-demand, and the procurement processing system 200 can offer to track the effect of changes on the customer's metrics, which will also allow the recommendation engine to further develop training data by measuring expected effects against observed effects. Thus, the new metrics developed and discussed in this disclosure can be used to provide many additional features for a procurement processing system 200. The modifications recommended by the procurement processing system 200 can result in improved performance of the procurement processing system itself, user computing devices, and the networks used to facilitate communication between the two based on a more efficient use of resources and by more accurately predicting the expected use of resources for tasks in a computer-implemented BSM process. As an example, recommended modifications can result in tasks in the workflow being performed by the procurement processing system directly, rather than on user devices and sent to the procurement processing system. This reduces network traffic and allows for the procurement processing system to predictably schedule the use of computing resources (e.g., CPU cycles, use of computer memory, use of non-volatile digital storage, network bandwidth, etc.) to accommodate the performance of the automated tasks.

In addition to recommending potential modifications for computer-implemented BSM processes, the procurement processing system 200 can use the data recorded in, for example, the invoice interaction history table 310 and invoice processing statistics table 330 (in addition to all other relevant data, not limited to just the metrics described herein) to automatically effectuate changes to workflow processes and configurations in order to optimize the performance of the workflow and of any computing systems carrying out the computer-implemented processes. Additionally or alternatively, the procurement processing system 200 may include additional modules, such as a workflow modification engine, configured to handle generation of workflow modifications. The workflow modification engine can be given sufficient privileges to, for example, restructure a workflow, modify parameters governing the operation of the workflow or the computing systems performing and supporting the workflow, or to modify the computing resources devoted to performance of the workflow.

As an example, the procurement processing system 200 can, on a granular level determine and apply modifications to the sequence, branch paths, and substance of steps that are available or used by agents interacting with the procurement processing system 200 (e.g., offered as a SaaS platform, standalone software tool, or specialized hardware). Like the above-described recommendations, the automated modifications can be determined in a variety of manner, including, but not necessarily limited to preprogrammed rule-based approaches or by using trained machine-learning models. The modifications can include adding steps to the workflow, removing steps from the workflow, merging steps, assigning work to selected agents, automating tasks determined to be readily susceptible to automation (e.g., text recognition or computation confirmation), scheduling of specific tasks to occur at times of high or low system usage (e.g., to efficiently use resources at under-utilized times), or a variety of other possible modifications. The modifications can be based directly on learning best practices from community leaders or by inferring a customer's preferences over time (e.g., determining that a customer prefers a certain order of tasks or prefers a certain agent to be assigned specific tasks).

Automatically modifying computer-implemented BSM processes, especially in the context of complex SaaS operations, when driven by the sort of advanced metrics discussed herein, can directly improve the operations of computing hardware responsible for executing the operations (e.g., one or more computer systems providing the procurement processing system 200). As an example, automatically applying the modifications can allow the computing systems to adapt to changes in customer demand or focus on-demand, without delays caused by human interjection to confirm a change in process. This then allows the computing systems to automatically adjust configurations, reducing unnecessary allocation of computing resources (e.g., CPU cycles, use of computer memory, use of non-volatile digital storage, network bandwidth, etc.).

Figure 6:
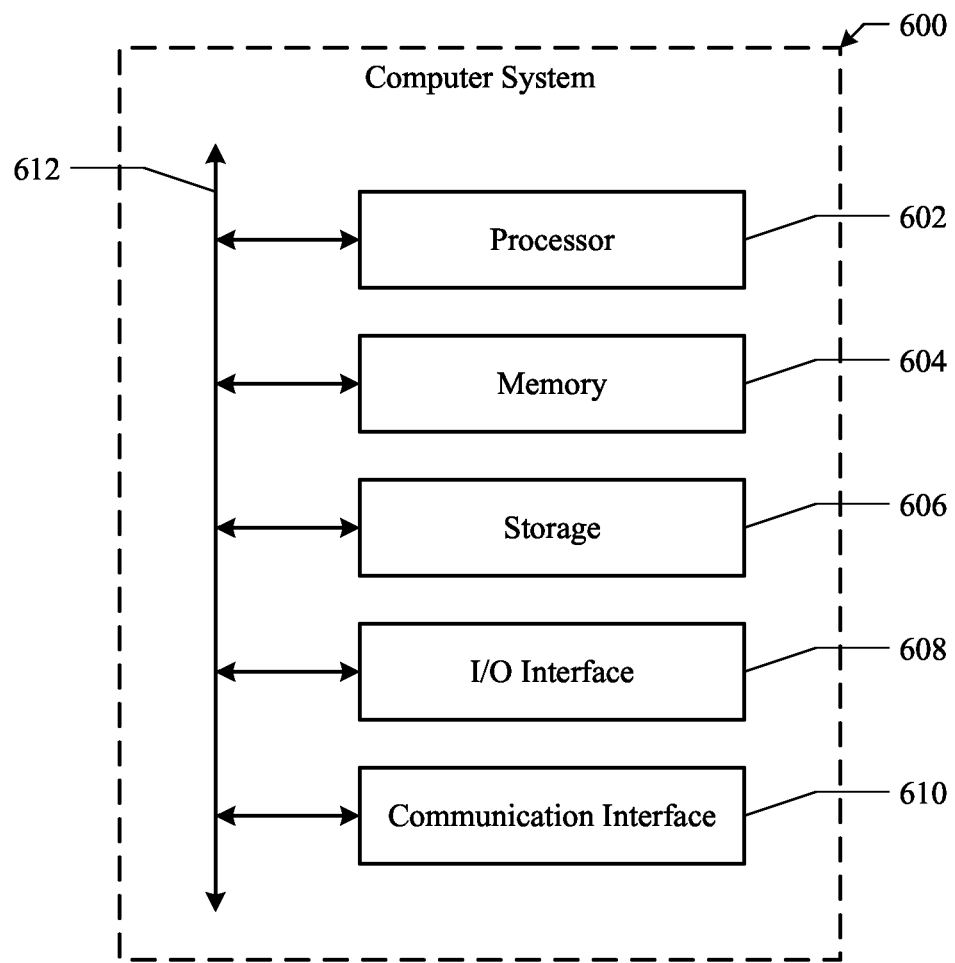
FIG. 6 illustrates an example computer system.

FIG. 6 illustrates an example computer system 600, which may be used to provide the procurement processing system 200. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method executed by a procurement processing system, the method comprising:

detecting activity of one or more agents of a plurality of agents of a customer that modifies a processing state of a first invoice of a plurality of invoices, each invoice requesting approval from the customer, wherein the activity is conducted by the one or more agents through interacting with the procurement processing system;

updating, based on the detected activity, an invoice interaction history record associated with the first invoice in an invoice interaction history datastore communicatively coupled to the procurement processing system, the invoice interaction history record associating an invoice identifier, supplier identifier, action of a particular agent, and role of a particular agent; the datastore comprising an instance-level datastore configured to store invoice interaction history records for the customer, a community-level datastore configured to store invoice interaction history records for a plurality of other customers including one or more community leaders, and a benchmarking metrics datastore; the updating including automatically deriving the action of the particular agent based upon transitions in states of the first invoice;

generating using dynamic refactoring one or more first metrics associated with the customer regarding activity of the plurality of agents affecting the processing state of the plurality of invoices based on the updated invoice interaction history datastore and digitally storing the one or more first metrics in the benchmarking metrics datastore, wherein the dynamic refactoring includes an industry-specific metric value and an overall metric value for a percentile-based analysis for refactoring;

executing a filter query with the benchmarking metrics datastore to determine a match between the one or more first metrics associated with the customer and second metrics of community leaders;

in response to determining the match, training a machine learning model to identify best practices associated with the customer based on activities associated with the customer;

determining, using the trained machine learning model, a recommendation of one or more changes in control features, configurations, and allocation of computing resources of the procurement processing system;

determining, using the training machine learning model, automated tasks to directly replace actions by the one or more agents using the recommendation of one or more changes, wherein the automated tasks comprise repetitive tasks;

determining, using the trained machine learning model, modifications to sequence, branch paths, and substance of steps in a workflow for processing invoices according to a specification associated with the customer using the best practices associated with the customer, wherein the modifications are associated with the automated tasks and the allocation of computing resources of the procurement processing system; and enforcing the recommendation by modifying an allocation of computing resources for the automated tasks to occur at under-utilized times for a user of the procurement processing system, based on the trained machine learning model.

2. The method of claim 1, wherein the detected activity of the one or more agents advances the workflow for processing invoices according to the specification associated with the customer.

3. The method of claim 2, further comprising:
generating the recommendation for altering the workflow for processing invoices based on the one or more first metrics regarding the activity of the one or more agents.

4. The method of claim 3, wherein the recommendation for altering the workflow comprises:
adding or removing one or more steps of the workflow;
modifying an assignment of agents to the one or more steps of the workflow; or
automating one or more steps of the workflow.

5. The method of claim 1, wherein detecting the activity of the one or more agents that modifies the processing state of the first invoice comprises:
receiving an input from the one or more agents;
determining the first invoice as an associated invoice based on the input;
determining a change in the processing state of the first invoice based on the input; and
storing the change in the processing state, an identifier for the one or more agents, and a timestamp in the invoice interaction history datastore.

6. The method of claim 1, wherein generating the one or more metrics regarding the activity of the plurality of agents comprises:
calculating one or more invoice processing statistics evaluating performance of the one or more agents in creating, reviewing, or approving the plurality of invoices.

7. The method of claim 1, further comprising:
calculating, for one or more metrics, a community average value of the metric, wherein the community average value of the metric is based on metrics generated for one or more additional customers that share a trait with the customer; and
providing the community average value of the metric for presentation to the user of the procurement processing system in association with the one or more generated metrics.

8. The method of claim 1, further comprising:
calculating, for one or more metrics, a community benchmark value of the metric, wherein the community benchmark value of the metric is based on metrics generated for one or more additional customers that share a trait with the customer; and
providing the community benchmark value of the metric for presentation to the user of the procurement processing system in associated with the one or more generated metrics.

9. The method of claim 8, further comprising calculating the community benchmark value of the metric by:
calculating metric values of a plurality of customers associated with the procurement processing system;
normalizing the metric values of the plurality of customers based on the shared trait;
refactoring the metric values to eliminate outlier values; and
calculating the community benchmark value from the refactored metric values.

10. The method of claim 9, wherein refactoring the metric values to eliminate outlier values comprises:
removing invalid values for the metrics, wherein the invalid values are determined based on a metric category of the metric;
identifying a percentile of remaining metrics corresponding to a percentile of customers having an optimal performance with respect to the remaining metrics;
determining that the percentile of remaining metrics comprises at least a threshold number of independent values; and
combining values of the percentile of remaining metrics.

11. The method of claim 1, wherein the one or more metrics comprise one or more of:
an average processing time for the one or more agents to approve an invoice of the plurality of invoices;
an average in-phase time for an invoice of the plurality of invoices corresponding to an amount of time spent by the invoice in a creation phase, review phase, or approval phase;
a number of invoices created, reviewed, or approved, by the one or more agents or by a first agent of the one or more agents; or
a number of invoices created, reviewed, or approved, by the one or more agents or by a first agent of the one or more agents, where a processing time of the invoice is greater than a projected time.

12. One or more computer-readable non-transitory storage media including instructions that, when executed by one or more processors of a procurement processing system, are configured to cause the one or more processors to perform operations comprising:
detecting activity of one or more agents of a plurality of agents of a customer that modifies a processing state of a first invoice of a plurality of invoices, each invoice requesting approval from the customer, wherein the activity is conducted by the one or more agents through interacting with the procurement processing system;
updating, based on the detected activity, an invoice interaction history record associated with the first invoice in an invoice interaction history datastore communicatively coupled to the procurement processing system, the invoice interaction history record associating an invoice identifier, supplier identifier, action of a particular agent, and role of a particular agent; the datastore comprising an instance-level datastore configured to store invoice interaction history records for the customer, a community-level datastore configured to store invoice interaction history records for a plurality of other customers including one or more community leaders, and a benchmarking metrics datastore; the updating including automatically deriving the action of the particular agent based upon transitions in states of the first invoice;
generating using dynamic refactoring one or more first metrics associated with the customer regarding activity of the plurality of agents affecting the processing state of the plurality of invoices based on the updated invoice interaction history datastore and digitally storing the one or more first metrics in the benchmarking metrics datastore, wherein the dynamic refactoring includes an industry-specific metric value and an overall metric value for a percentile-based analysis for refactoring;
executing a filter query with the benchmarking metrics datastore to determine a match between the one or more first metrics associated with the customer and second metrics of community leaders;
in response to determining the match, training a machine learning model to identify best practices associated with the customer based on activities associated with the customer;
determining, using the trained machine learning model, a recommendation of one or more changes in control features, configurations, and allocation of computing resources of the procurement processing system;

determining, using the training machine learning model, automated tasks to directly replace actions by the one or more agents using the recommendation of one or more changes, wherein the automated tasks comprise repetitive tasks;

determining, using the trained machine learning model, modifications to sequence, branch paths, and substance of steps in a workflow for processing invoices according to a specification associated with the customer using the best practices associated with the customer, wherein the modifications are associated with the automated tasks and the allocation of computing resources of the procurement processing system; and enforcing the recommendation by modifying an allocation of computing resources for the automated tasks to occur at under-utilized times for a user of the procurement processing system, based on the trained machine learning model.

13. The one or more computer-readable non-transitory storage media of claim 12, wherein the detected activity of the one or more agents advances the workflow for processing invoices according to the specification associated with the customer.

14. The one or more computer-readable non-transitory storage media of claim 13, wherein the instructions are further configured to cause the one or more processors to perform operations further comprising:

generating the recommendation for altering the workflow for processing invoices based on the one or more first metrics regarding the activity of the one or more agents.

15. The one or more computer-readable non-transitory storage media of claim 14, wherein the recommendation for altering the workflow comprises:

adding or removing one or more steps of the workflow;

modifying an assignment of agents to the one or more steps of the workflow; or automating one or more steps of the workflow.

16. A procurement processing system comprising: one or more processors; and one or more computer-readable non-transitory storage media in communication with the one or more processors and comprising instructions, that when executed by the one or more processors, are configured to cause the procurement processing system to perform operations comprising:

a computer-implemented method executed by a procurement processing system, the method comprising:

detecting activity of one or more agents of a plurality of agents of a customer that modifies a processing state of a first invoice of a plurality of invoices, each invoice requesting approval from the customer, wherein the activity is conducted by the one or more agents through interacting with the procurement processing system;

updating, based on the detected activity, an invoice interaction history record associated with the first invoice in an invoice interaction history datastore communicatively coupled to the procurement processing system, the invoice interaction history record associating an invoice identifier, supplier identifier, action of a particular agent, and role of a particular agent; the datastore comprising an instance-level datastore configured to store invoice interaction history records for the customer, a community-level datastore configured to store invoice interaction history records for a plurality of other customers including one or more community leaders, and a benchmarking metrics datastore; the updating including automatically deriving the action of the particular agent based upon transitions in states of the first invoice;

generating using dynamic refactoring one or more first metrics associated with the customer regarding activity of the plurality of agents affecting the processing state of the plurality of invoices based on the updated invoice interaction history datastore and digitally storing the one or more first metrics in the benchmarking metrics datastore, wherein the dynamic refactoring includes an industry-specific metric value and an overall metric value for a percentile-based analysis for refactoring;

executing a filter query with the benchmarking metrics datastore to determine a match between the one or more first metrics associated with the customer and second metrics of community leaders;

in response to determining the match, training a machine learning model to identify best practices associated with the customer based on activities associated with the customer;

determining, using the trained machine learning model, a recommendation of one or more changes in control features, configurations, and allocation of computing resources of the procurement processing system;

determining, using the training machine learning model, automated tasks to directly replace actions by the one or more agents using the recommendation of one or more changes, wherein the automated tasks comprise repetitive tasks;

determining, using the trained machine learning model, modifications to sequence, branch paths, and substance of steps in a workflow for processing invoices according to a specification associated with the customer using the best practices associated with the customer, wherein the modifications are associated with the automated tasks and the allocation of computing resources of the procurement processing system; and enforcing the recommendation by modifying an allocation of computing resources for the automated tasks to occur at under-utilized times for a user of the procurement processing system, based on the trained machine learning model.

17. The procurement processing system of claim 16, wherein the detected activity of the one or more agents advances the workflow for processing invoices according to the specification associated with the customer.

18. The procurement processing system of claim 17, wherein the instructions are further configured to cause the one or more processors to perform operations further comprising:

generating the recommendation for altering the workflow for processing invoices based on the one or more first metrics regarding the activity of the one or more agents.

* * * * *